Sept. 17, 1946.                A. M. O. SMITH                    2,407,852
                              REACTION MOTOR
                          Filed July 17, 1943           2 Sheets-Sheet 2

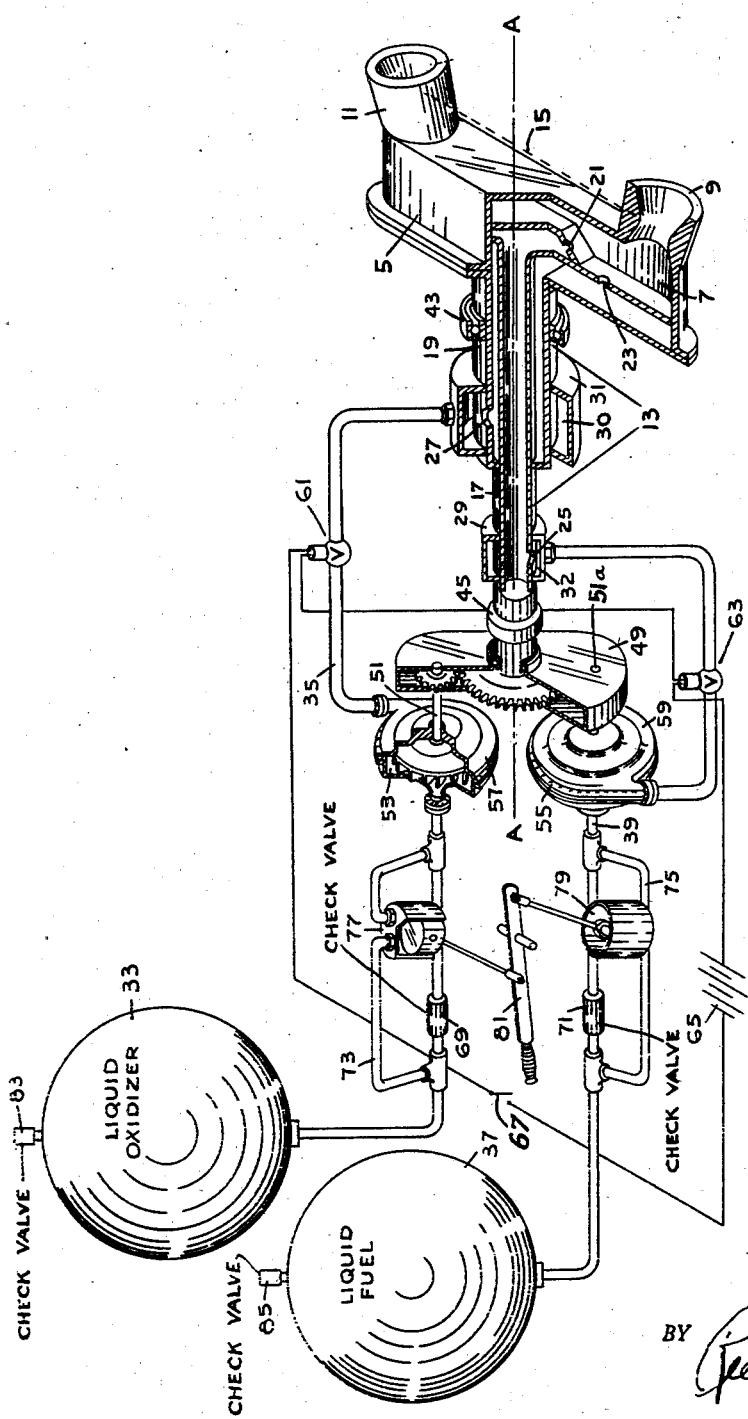

APOLLO M.O. SMITH
    *INVENTOR.*

BY *Reed C. Lawlor*
           AGENT

Patented Sept. 17, 1946

2,407,852

UNITED STATES PATENT OFFICE 2,407,852

REACTION MOTOR

Apollo M. O. Smith, Bell, Calif., assignor to Aerojet Engineering Corporation, Azusa, Calif., a corporation of Delaware Application July 17, 1943, Serial No. 495,198

3 Claims. (Cl. 60—35.6)

My invention pertains to jet propulsion and more particularly to the application of jet propulsion systems utilizing liquid propellants to airplanes or other heavier-than-air craft.

Jet propulsion systems for aircraft have heretofore been proposed in which tanks of liquid propellant fuel have been used for supplying the combustion chambers of the jet motors. For example, separate tanks of liquid fuel and oxidizer have been provided, and a high pressure has been supplied from a separate pressure source, such as a high pressure inert gas tank to force these liquids into the motors against the pressure developed in the motors. Such systems have involved installations of considerable weight, inasmuch as the tanks must be built heavy enough to withstand the pressure. Furthermore the weight requirements have greatly limited the permissible size of the tanks in the aircraft.

It is desirable to make the tanks of as light a construction as possible in order that they may be built larger to hold more fuel and thus operate the motors longer. I have accomplished this lightening of the construction in accordance with my invention by removing the high pressure from the propellant liquid tanks and developing the pressure instead by a small light pumping system correlated with the jet motors; and these pumps are used to develop the necessary pressure.

The possibility of using pumps for pumping propellants to a jet motor has heretofore been inherently difficult as jet motors by their very nature have not lent themselves to driving pumping operations. In accordance with a feature of my invention I have overcome this previous difficulty by mounting the combustion chamber of the motor for rotation and providing the exhaust jets from the chamber at such an angle as to rotate the chamber at the same time that the desired reaction thrust from the jets is being delivered. The rotation of the chamber is used to drive the pumps which pump the propellants into the chamber.

The foregoing and other features of the invention will be better understood from the following detailed description and the accompanying drawings of which:

Fig. 1 is an isometric view, partly in section and partly schematic, of a jet propulsion system incorporating my invention;

In the jet propulsion system, illustrated in Fig. 1 I have shown one preferred form of jet motor 5 of the type incorporating my invention. The jet motor includes a combustion chamber 7 and a pair of converging-diverging nozzles 9 and 11 providing communication between the interior of the combustion chamber and the surrounding medium. This jet motor is mounted upon a rotatable shaft 13 having an axis A—A extending in the direction in which it is desired to produce a thrust reaction for driving an airplane or other vehicle upon which the jet motor is mounted. Thrust is produced on the motor when combustion gases or other fluid escape through the nozzles.

The axes of the nozzles are displaced from the shaft axis and are inclined slightly with respect thereto. Both nozzles are directed in a generally rearward direction normal to the line 15 joining their centers and are inclined at a small angle in opposite directions from the plane passing through the shaft axis A—A and said line 15. The nozzles are preferably of the same size and shape and are inclined at the same small angle. Thus this motor is symmetrical about the shaft axis A—A.

Figure 2:
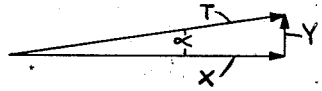
Fig. 2 is a vector diagram used to explain the relationship between the axial and tangential components of thrust.

As products of combustion are expelled through said nozzles a reactive thrust T, Fig. 2, is produced on the jet motor along the axis of each nozzle. This thrust has a large axial component X and a small tangential component Y, the axial component X being parallel to the shaft axis A—A and the tangential component Y being in a direction tangent to a circle passing through the centers of the nozzles in a plane perpendicular to the shaft axis A—A. The tangential component (Y) of thrust is greater than the loss of thrust (T—X) in an axial direction as long as the angle of inclination $\alpha$ is less than 45°. I have found that sufficient torque for driving propellant transfer pumps may be obtained if the angle of inclination is so small, say less than about 15°, that the resultant diminution of axial thrust is only a few percent.

Figure 3:
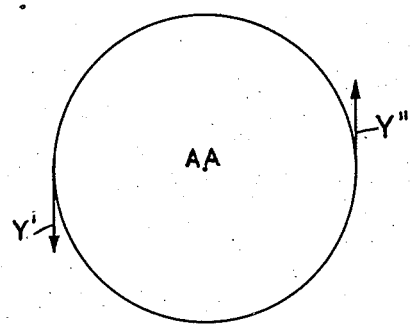
Fig. 3 is a diagram used in explaining how the tangential components of thrust produce rotation of a rotatable element in the preferred form of my invention.

The tangential components of thrust Y' and Y" produced by fluids escaping from the two nozzles 9 and 11 respectively extend in opposite directions in the plane of said circle and tend to rotate the jet motor in the same direction about the axis of the shaft, as illustrated in Fig. 3. Each of these components of thrust preferably produce equal torques about said axis so that no net force is produced on the motor transverse to the shaft axis, which might bend the shaft.

In the example shown, the shaft 13 upon which the jet motor 5 is mounted is formed from two concentric tubular members 17 and 19. The passage between the two tubular members communicates with a first set of orifices 23 in the wall of the combustion chamber. The passage in the smaller tube communicates with a second set of orifices 21 in the wall of the combustion chamber. For simplicity only one orifice of each set is shown in the drawings. The tubular member 17 of small diameter is longer than the tubular member 19 of large diameter. The two tubular members 17 and 19 have entrance ports 25 and 27 respectively in the walls thereof.

The parts of the tubular members containing such ports are enclosed within fluid transfer bearings, or feed rings, 29 and 31 respectively. Said feed rings are in the form of bearings having annular recesses on the interior sides thereof and forming with the exterior walls of the respective tubular members annular liquid chambers 30 and 32.

Said liquid chambers 30 and 32 communicate with the orifices of the combustion chamber through the ports 27 and 25 respectively in the walls of the tubular members. One liquid chamber 30 communicates with a supply 33 of liquid oxidizer through a first conduit 35. The other liquid chamber 32 communicates with a supply 37 of liquid fuel through a second conduit 39.

A thrust bearing 43 is secured to the outer tube and is adapted for supporting the jet motor upon the vehicle to be driven. A second bearing 45 secured to the smaller tubular member is provided to maintain the shaft axis in predetermined alignment with the longitudinal axis of the airplane.

At the end of the shaft 13 remote from the jet motor there is a speed increasing set of gears 49. Said system has two output shafts 51 and 51a connected to the impellers of two centrifugal pumps 59 and 57 respectively. By virtue of the gear arrangement, the impellers are driven at a higher speed of rotation than the jet motor.

The centrifugal pumps 57 and 59 are included in said conduits 35 and 39.

Electromagnetic valves 61 and 63 are connected in the sections of said conduits between the output sides of the centrifugal pumps and the feed rings 31 and 29 respectively. These valves are normally closed and may be opened by applying current thereto from a battery 65 by closing a switch 67.

Check valves 69 and 71 are included in the portions of the conduits 35 and 39 respectively between said propellant tanks 33 and 37 and the inlets of the centrifugal pumps 57 and 55, said valves being adapted to permit the flow of propellants only in the direction from the propellant tanks to the pumps.

Branch lines 73 and 75 are connected in the conduits 35 and 39 respectively and terminate on opposite sides of the corresponding check valves 69 and 71. These branch lines include hand pumps 77 and 79 respectively. Said hand pumps are adapted to transfer propellants from their containers to the corresponding centrifugal pumps and thence into the combustion chamber 7. Said hand pumps may be operated by manipulation of a common pivoted lever 81 operably connected thereto.

In order to initiate operation of the jet motor the electromagnetic valves are opened by closing switch 67 and the centrifugal pumps are primed by manipulation of the hand pumps.

As manipulation of the hand pumps continues the propellants flow through said electromagnetic valves 61 and 63 and into the fluid chambers of the feed rings. From these chambers the propellants flow into the passages in the shaft and thence through the corresponding injection orifices into the combustion chamber.

In practice I prefer to utilize propellants, such as aniline and red fuming nitric acid which are spontaneously combustible when mixed as more fully described in copending application by Frank J. Malina, et al., Serial No. 486,236, filed May 8, 1943. Thus when the streams of fuel and oxidizer impinge and mix within the combustion chamber they vaporize, and burn, producing within the combustion chamber gas at high temperature and high pressure. Under the influence of the chamber pressure, the products of combustion are expelled through the nozzles, thereby producing a propulsive thrust parallel to the axis of the jet motor shaft and a torque which causes the shaft to rotate.

As the shaft gains speed the centrifugal pumps force the propellants into the combustion chamber with increasing pressure. When the pressure produced by the centrifugal pumps alone exceeds the chamber pressure, the operation of the hand pumps may be discontinued. The jet motor will then continue to operate under its own power.

Check valves 83 and 85 are connected in the tops of the propellant tanks 33 and 37 so that air may be drawn into said tanks as the propellants are withdrawn therefrom.

It is advantageous to use speed increasing means between the jet motor shaft and the centrifugal pumps. When using such speed increasing means, pumps of a given size will operate at higher speed than the motor shaft, thereby forcing the propellants into the combustion chamber against the pressure contained therein.

While I have described a specific jet motor utilizing two nozzels similarly located on opposite sides of the axis of rotation it is clear that the principles of my invention may also be utilized even if only one such nozzle were mounted on a rotatable element. However, in order to avoid the production of a component of thrust transversely to the shaft, I prefer to utilize a plurality of such nozzles uniformly spaced on a circle about such axis and uniformly inclined to said axis.

Figure 4:
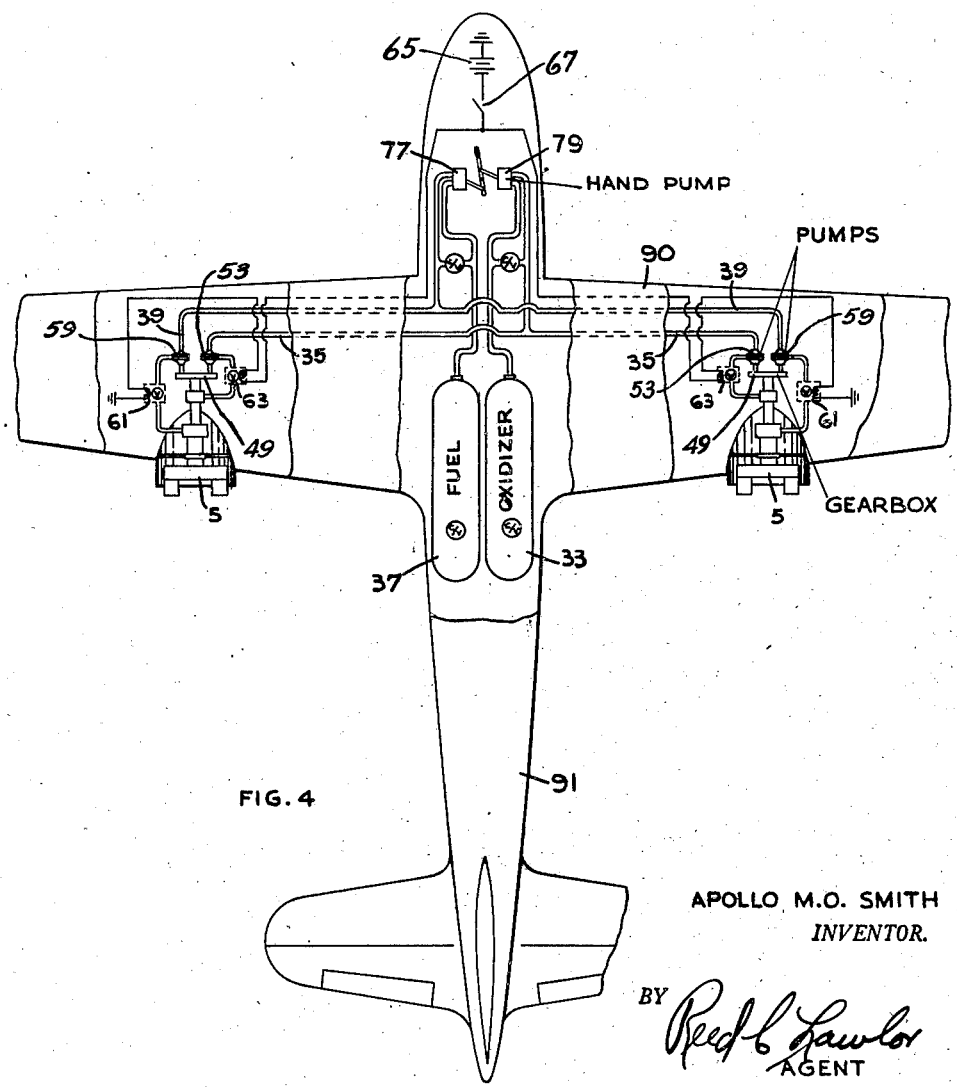
Fig. 4 is a schematic diagram of an airplane utilizing two of my jet propulsion motors.

One way of applying my invention to an airplane is shown in Fig. 4. In the example illustrated there, two of my jet motors 5 are rotatably mounted adjacent the trailing edge of the airplane wing 90 and on opposite sides of the fuselage 91. In this instance branch conduits 35 and 39 are provided for supplying each jet motor 5 with oxidizer and fuel from common propellant supply tanks 33 and 37 through common hand pumps 77 and 79.

Each of the jet motor units comprises a pair of propellant transfer pumps 59 and 53 and corresponding means 49 driven by the jet motors when rotating adapted to operate those pumps to force fuel and oxidizer into the combustion chambers of the respective jet motors 5. The electromagnetic valves 61 and 63 positioned in the propellant flow conduits in accordance with the principles set forth hereinabove may be operated by a common switch 67 which supplies current thereto from a common battery 65.

From the foregoing description it will be clear that I have provided a lightweight, compact jet propulsion system which is self-sustaining once its operation is initiated and which may operate for a long period of time.

I claim:

1. A rotating jet motor comprising a combustion chamber, a rotatable shaft having its rear end attached to the chamber at a central position of the latter, the axis of rotation passing through the chamber, a plurality of exhaust nozzles through the rear wall of the chamber, radially offset from the axis of rotation, to allow the escape of gases from the chamber in the form of high velocity gas jets, the axes of gas flow through said nozzles being directed rearwardly almost in the direction of the axis of rotation but having an angle of inclination in the tangential direction to produce a rotating force, said shaft having a plurality of fluid conducting channels extending in the axial direction, means for supplying fluids which are combustible in the presence of each other, into said channels, one of the fluids being supplied to one channel and the other fluid to the other channel, means providing communication from each channel into the chamber, said means comprising partition means between each channel and the chamber and orifice means through the partition means to the chamber, whereby the two propellant fluids passing through said orifices meet in said chamber, and upon combustion produce gases under pressure which are ejected through the nozzles.

2. A rotating jet motor comprising a combustion chamber, a rotatable shaft having its rear end attached to the chamber at a central position of the latter, the axis of rotation passing through the chamber, a channel for fluid flow extending axially through the shaft, means providing communication from the rear end of the channel into the chamber, said means comprising a partition containing fluid injection orifices between the rear end of the channel and the chamber, a second fluid flow channel attached to the shaft and extending axially along the shaft, means providing communication from the second channel into the combustion chamber, said last-named means comprising a partition provided with injection orifices between the second channel and the chamber, means for supplying fluids which are combustible in the presence of each other, into said channels, one of the fluids being supplied to one channel and the other fluid to the other channel, whereby the two propellant fluids passing through their respective orifices meet in said chamber, and a plurality of exhaust nozzles extending through the chamber to allow the escape of gases resulting from combustion of the propellant fluids from the chamber in the form of high velocity gas jets, the axes of gas flow through said nozzles being radially offset from the axis of rotation and directed rearwardly almost parallel to the axis of rotation to produce axial thrust but having an angle of inclination in the tangential direction to produce a rotating force.

3. A rotating jet motor comprising a rotatable shaft, a combustion chamber fixed on the end of said shaft and arranged so that the axis of rotation passes centrally through the chamber, a first channel for fluid flow extending axially along the shaft, a first set of injection orifices providing communication from the channel into the chamber, a second fluid flow channel extending axially along the shaft, a second set of injection orifices providing communication between the second channel and the chamber, means for supplying fluids which are combustible in the presence of each other, one of said fluids being supplied to one channel and the other fluid to the other channel, means providing communication from each channel into the chamber, said means comprising partition means between each channel and the chamber and orifice means through the partition means to the chamber, whereby the two fluids meet in said chamber and when combusted produce gases under high pressure, an exhaust nozzle from said chamber to allow the escape of gas from the chamber in the form of a high velocity jet, said nozzle being located at some radial distance from the axis of rotation, the axis of gas flow through the nozzle being directed rearwardly nearly parallel to the axis of rotation to produce axial thrust and having an angle of inclination in the direction tangential to the rotation of the chamber to produce a rotating force.

APOLLO M. O. SMITH.